United States Patent [19]

Dorsman

[11] 4,219,276

[45] Aug. 26, 1980

[54] DETECTION SYSTEM FOR RING LASER GYRO

[75] Inventor: Adrian K. Dorsman, Bellflower, Calif.

[73] Assignee: Rockwell International Corporation, El Segundo, Calif.

[21] Appl. No.: 947,911

[22] Filed: Oct. 2, 1978

[51] Int. Cl.³ .......................... G01B 9/02; G01B 9/00
[52] U.S. Cl. .................................................... 356/350
[58] Field of Search ............................... 356/350, 351

[56] References Cited

U.S. PATENT DOCUMENTS 4,152,072  5/1979  Hutchings .......................... 356/350

*Primary Examiner*—Vincent P. McGraw
*Attorney, Agent, or Firm*—H. Fredrick Hamann; Rolf M. Pitts

[57] ABSTRACT

A detection system for a ring laser gyro includes an array of photo-diodes mounted in the path of the laser beams, preferably on one of the laser mirrors. The outputs of the photo-diodes are selectively fed to first and second differential amplifiers to provide first and second outputs in quadrature relationship which represent the fringe or beat signal patterns generated between the clockwise and counter-clockwise rotating laser beams. An intensity signal for use in tuning and adjusting the laser for maximum output is generated from the very same diodes utilized for generating the quadrature related fringe signals. This end result is achieved by placing the terminals of the diodes not connected to the differential amplifier in parallel with each other and placing an amplifier in the current feed path for these elements, thereby providing a signal to the amplifier representing the sum of the photo-diode currents. This provides as the output of the last mentioned amplifier a relatively high level intensity signal having minimum fluctuations in amplitude.

6 Claims, 5 Drawing Figures

DETECTION SYSTEM FOR RING LASER GYRO

BACKGROUND OF THE INVENTION

This invention relates to ring laser gyros, and more particularly to a detection system for such a laser gyro which provides signals representing the fringe pattern and signal intensity from the same detector array.

In ring laser gyros, generally photo detectors, such as photo-diodes, are placed either directly on one of the gyro mirrors or at some other position where they can receive optical signals from both the clockwise and counter-clockwise rotating beams of the laser. Typically in prior art systems, two pairs of such photo detectors are used to generate quadrature related signals which can be compared with each other in appropriate computation circuitry to determine magnitude and direction of the input velocity to the gyro. Typical such prior art systems are disclosed in U.S. Pat. No. 3,721,497, issued Mar. 20, 1973, to Sidney G. Shutt et al., assigned to the assignee of the present application; U.S. Pat. No. 3,468,608, issued Sept. 23, 1969, to B. Doyle; and U.S. Pat. No. 3,854,819, issued Dec. 17, 1974, to Andringa.

While none of the aforementioned patents have any disclosure in this regard, in more recent systems, it has been found highly desirable to generate a signal in accordance with the intensity of the fringe pattern signal. This is to provide a control signal for tuning and adjusting the laser for maximum output. For such an intensity signal to be useful, it must be fairly constant in value, i.e., the fluctuations in the fringe pattern signal must be minimized in developing the intensity signal. In order to achieve this end result in the prior art, one or two relatively large surface area photo-diodes separate from the photo-diodes employed for generating the quadrature related fringe signal, are placed in the optical path of the laser beams and their outputs fed to an appropriate amplifier. This, of course, necessitates an additional diode pair beyond the first set of detectors requiring additional wiring, packaging and expense for the fabrication of the unit.

SUMMARY OF THE INVENTION

The present invention overcomes the aforementioned shortcomings of the prior art by employing the same diodes used for generating the fringe pattern signals for providing the intensity signal. An array of such diodes is used, there being sufficient diodes in this array to provide an intensity signal having minimum fluctuations. This end result is achieved by constructing a diode array which in a preferred embodiment includes eight diode strip elements, the centers of these elements being spaced from each other a distance equal to 90° with respect to the fringe pattern. This array is placed so as to receive the CW and CCW laser beams with one of the terminals of each photo-diode connected in a preselected manner to an appropriate one of two differential amplifiers which produce the desired quadrature related fringe pattern signals. The other terminals of the photo-diodes are connected in parallel to a single amplifier which is connected in series with the current path to the diodes, this amplifier generating a signal representing the sum of the photo currents of all the diodes which provides an intensity signal having minimum fluctuations.

It is therefore an object of this invention to provide for a ring laser gyro system employing lesser parts and being more economical in its construction than prior art systems.

It is a further object of this invention to provide a detection system for a ring laser system which has a relatively constant intensity signal which is generated with the same diodes employed for generating the fringe pattern signals.

Other objects of this invention will become apparent as the description proceeds in connection with the accompanying drawings of which:

DESCRIPTION OF THE PREFERRED EMBODIMENT

Figure 1:
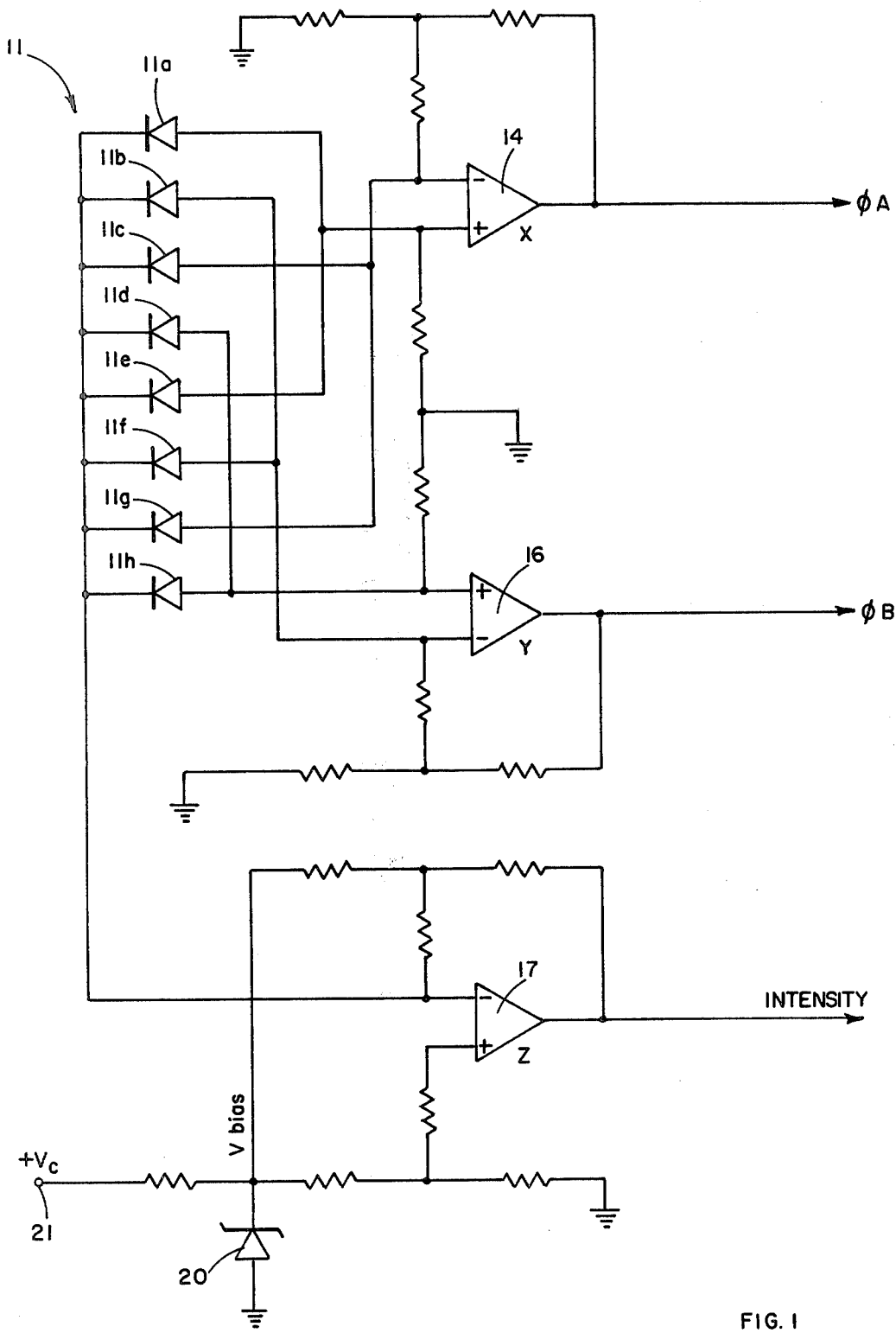
FIG. 1 is a schematic drawing of a preferred embodiment of the invention.

Referring now to FIG. 1, a schematic drawing of the preferred embodiment of the invention is shown. A photo-diode array 11, as to be explained further on in the specification, may be in the form of a monolithic chip with diode diffusing and bonding pads. This array is made up of eight diodes 11$a$–11$h$. The use of eight diodes is not necessary insofar as the generation of the quadrature related fringe pattern signals go. These signals could be adequately generated with three or four diodes. However, it has been found through experimentation and analysis that the averaging effect of about eight diodes is needed to produce an intensity signal having fluctuations in intensity which are low enough to provide a satisfactory signal for use in tuning and adjusting the laser for maximum output. Diodes 11$a$–11$h$ are preferably silicon pin photo-diodes.

The anodes of photo-diodes 11$a$ and 11$e$ are connected to the positive input of differential amplifier 14, while the anodes of diodes 11$c$ and 11$g$ are connected to the negative input of differtial amplifier 14. The anodes of diodes 11$d$ and 11$h$ are connected to the positive input of differential amplifier 16 while the anodes of diodes 11$b$ and 11$f$ are connected to the negative input of differential amplifier 16. As already noted, only two pairs of diodes, or in a special design three diodes, would be needed to produce the quadrature related fringe signals. However, the paralleling of the outputs of two diodes for each input increases the amplitude of the signals. The output of differential amplifier 14 represents the "phase A" fringe signal, while the output of amplifier 16 represents the "phase B" fringe signal, these two signals being in quadrature relationship with each other and being used in suitable computing circuitry as is well known in the art to generate an output signal representing the magnitude and direction of the velocity input signal to the gyro. As to be explained more fully in connection with FIGS. 2 and 5, the spacing between adjacent photo-diodes must be approximately equal to 90° of the fringe pattern.

All of the cathodes of diodes 11a–11h are connected in parallel to the negative input of differential amplifier 17. A positive bias signal is provided for the positive input of amplifier 17 by means of zener diode 20 which generates a fixed voltage of 10 volts in response to the supply voltage supplied to terminal 21. This provides a fixed bias to the positive input of amplifier 17 of about 9 volts. This voltage also is used as a bias voltage for the diodes. The use of a bias voltage of this magnitude on the diodes decreases the effects of the capacitances of these diodes and improves the frequency response thereof without significantly affecting their output which is dependent almost entirely upon the radiation received thereby. Thus, the current path for the diodes is completed through the circuit including amplifier 17, the radiation output of the diodes being amplified by this amplifier.

Figure 4:
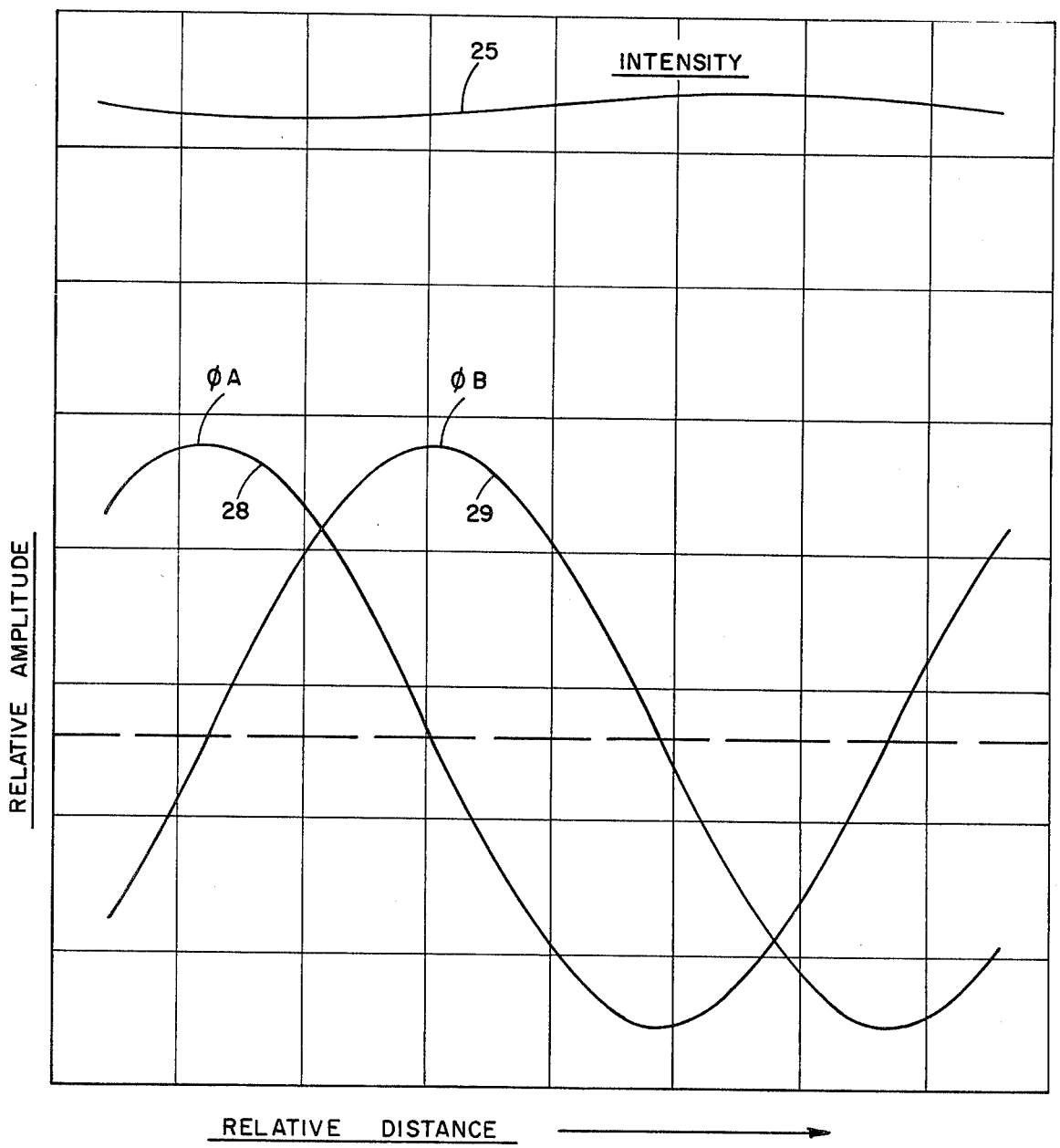
FIG. 4 is a series of wave forms illustrating the output signals generated in the preferred embodiment.

The output of amplifier 17 represents the sum of the currents to all of diodes 11a–11h, the average of these currents having a minimum fluctuation. A typical intensity output signal obtained in an operative embodiment of the invention from amplifier 17 is shown by graph line 25 of FIG. 4, where it can be seen that there is a very minor variation in amplitude of the intensity signal over the cyclical period of the fringe pattern represented by graph lines 28 and 29. Graph lines 28 and 29 show the "phase A" and "phase B" fringe pattern signals respectively, which are outputted from amplifiers 14 and 16. As can be seen, these two fringe pattern signals are in quadrature relationship.

Figure 2:
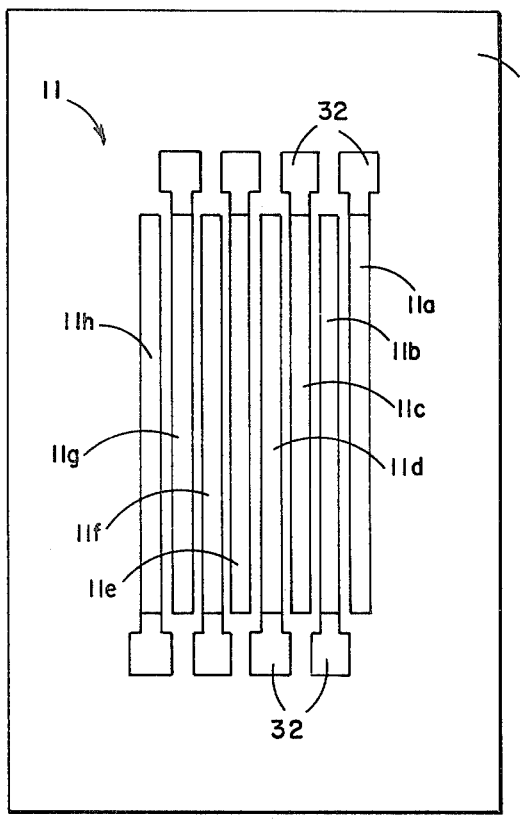
FIG. 2 is an illustration showing a photo-diode array which may be employed in the preferred embodiment.
Figure 3:
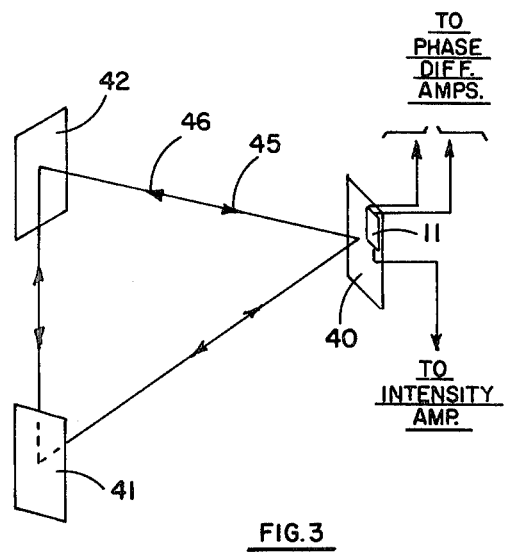
FIG. 3 is a schematic drawing illustrating the photo-diode array of FIG. 2 mounted on a mirror of a ring laser.

Referring now to FIG. 2, the photo-diode array, which is in the form of a monolithic chip of silicon-pin material, is shown. The diodes 11a–11h are in the form of strips which are formed on substrate 30 and have anode leads 32 extending therefrom, the cathodes being commonly connected together. The cathode outputs are commonly taken from the back of the substrate. The diode-amplifier assembly which includes the diode chip may be bonded to a corner of one of the laser mirrors 40, as shown in FIG. 3, which schematically illustrates a typical ring laser gyro employing three mirrors 40, 41 and 42 with clockwise and counter-clockwise beams, as indicated by arrows 45 and 46, being established thereby. This, of course, is a very schematic representation and does not show means for establishing the clockwise and counter-clockwise beams which is well known in the art. The beat signal or fringe pattern generated by the interference between the clockwise and counter-clockwise beams with an input to the gyro is detected by the photo-diodes which generate output signals in accordance therewith. These signals are fed to differential amplifiers which develop quadrature related fringe signals and to an intensity amplifier which provides an intensity signal as has been described in connection with FIG. 1. It is to be noted that the photo-diode array assembly need not be placed on one of the mirrors in the laser ring and could be mounted away from the ring with suitable optics, such as a beam splitter, being used to direct a portion of the laser radiation thereon, as for example, as shown in the aforementioned, U.S. Pat. No. 3,721,497 to Shutt et al.

Figure 5:
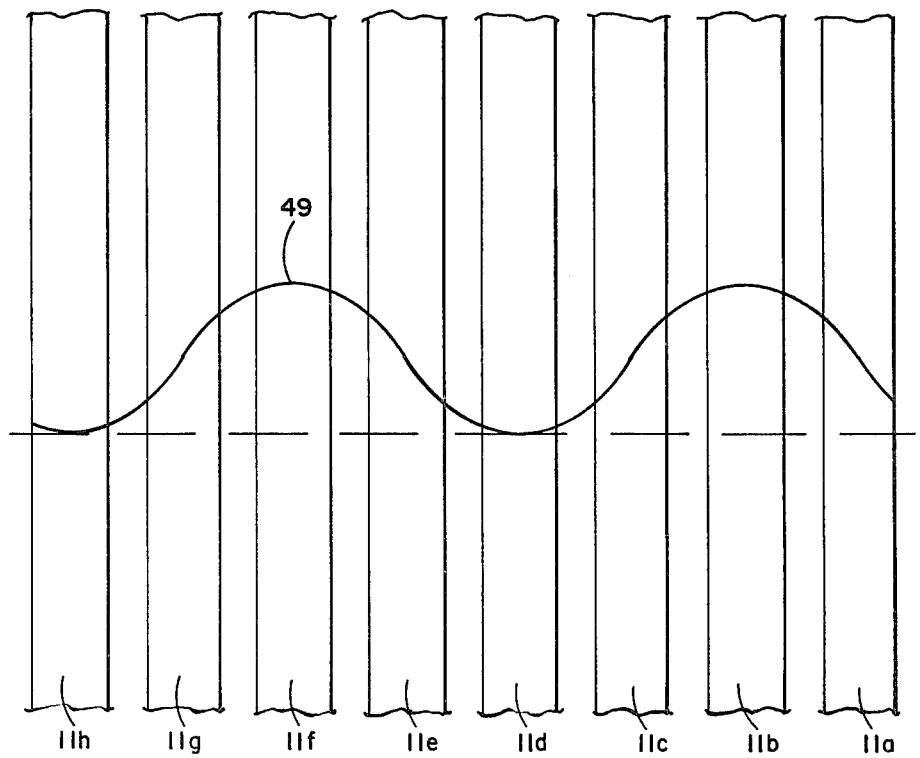
FIG. 5 is a schematic illustration showing the relationship between the photo-diode elements and the fringe pattern signal in the preferred embodiment.

Referring now to FIG. 5, the relationship between a typical fringe pattern generated in the device of the invention and the diode elements of the diode array is illustrated. Waveform 49 represents the fringe pattern which is positionally shown with respect to the diode elements 11a–11h. As can be seen, the spacing between the central longitudinal axes of adjacent diode elements is substantially 90° with respect to the fringe pattern, such that diodes 11a and 11e; diodes 11d and 11h; diodes 11c and 11g; and diodes 11b and 11f have fringe pattern signals which are respectively in phase with each other. A simple analysis will indicate how the signals fed to differencing amplifiers 14 and 16 produce the quadrature "phase A" and "phase B" signals shown in FIG. 4.

While a lower ripple or fluctuation in the intensity signal can be achieved with a diode array having a greater number of diode elements than eight, such as, for example, twelve elements, the practical minimum spacing of the individual diodes in an array results in a loss of both signal magnitude and average intensity when a greater number of elements than eight is employed without providing an appreciable improvement in ripple reduction. With eight elements, in a practical embodiment of the invention, the intensity output had only 4% ripple. It has been found that with a lesser number of elements than eight, the ripple increases to an undesirable degree.

While the invention has been described and illustrated in detail, it is clearly to be understood that this is intended by way of illustration and example only and is not to be taken by way of limitation, the spirit and scope of this invention being limited only by the terms of the following claims.

I claim:

1. In a detection system for a ring laser gyro having a plurality of mirrors placed to form clockwise and counter-clockwise rotating beams, an array of photo-diodes mounted to receive both of said beams, said photo-diodes generating fringe pattern signals in accordance with the difference frequency between the two beams, said diodes being in the form of longitudinal spaced strips, the spacing between the longitudinal centerlines of adjacent strips being equal to 90° of the fringe pattern signals, the number of said strips being eight; the outputs of the first and fifth, second and sixth, third and seventh and fourth and eighth strips being in phase with each other respectively, differential amplifier means receiving the outputs from one of the terminals of each of said photo-diodes in a preselected manner for generating a pair of fringe pattern signals in quadrature relationship with each other, and amplifier means in series with the current path to all of the other of the terminals of said photo-diodes for generating a signal having minimum fluctuations which is in accordance with the sum of the currents generated by all of said diodes and represents the total intensity of the fringe pattern signals.

2. The system of claim 1 and further including means for providing a bias signal to said diodes so as to increase the frequency response thereof.

3. The system of claim 1 wherein said array is mounted on one of the mirrors of said ring laser gyro.

4. The system of claim 1 wherein said differential amplifier means comprises first and second differential amplifiers, the in phase outputs of said first and fifth; and fourth and eighth of said diode strips being fed to the positive inputs of said first and second amplifiers respectively, the in-phase outputs of said third and seventh; and second and sixth of said diode strips being fed to the negative inputs of said first and second amplifiers respectively.

5. The system of claim 1 wherein said one of said terminals are the anodes of said diodes and the other of said terminals are the cathodes of said diodes.

6. The system of claim 2 wherein the means for providing a bias signal comprises a zener diode.

* * * * *